July 22, 1924.
A. H. NEUKOM
1,502,480
AUTOMOBILE LUGGAGE RACK
Filed Dec. 20, 1920
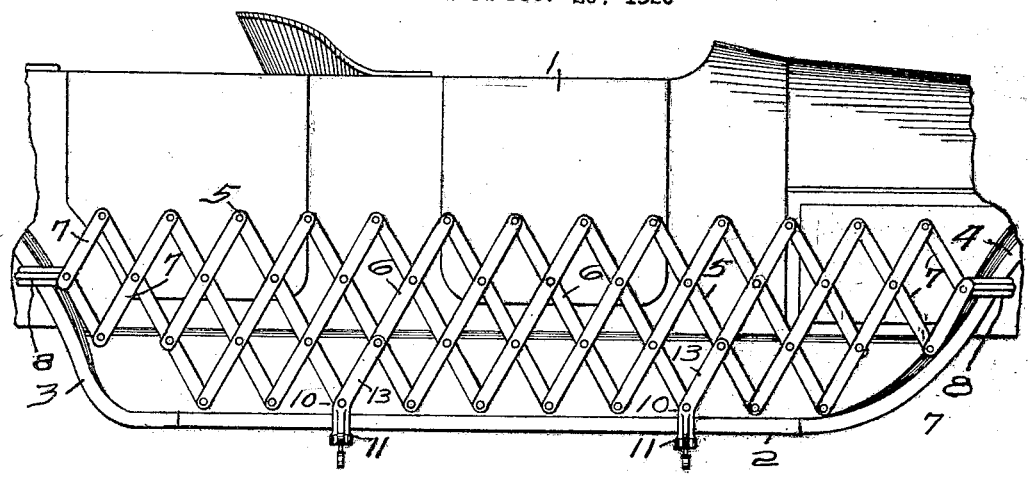
Fig. I.
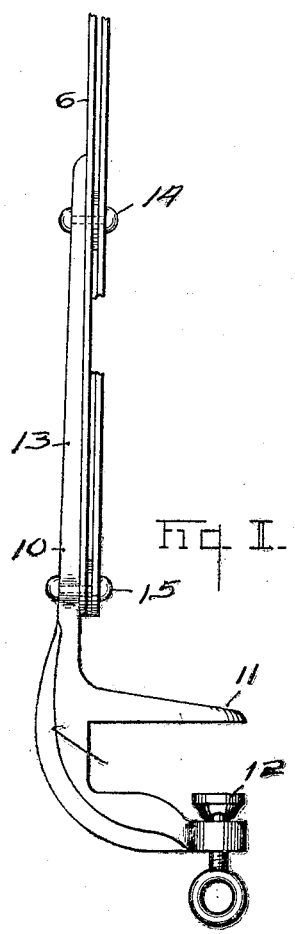
Fig. III.
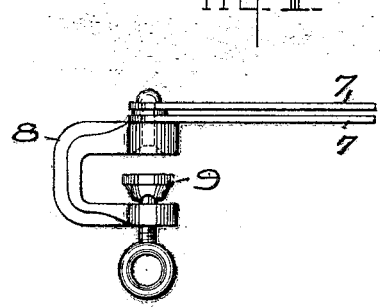
Fig. II.
INVENTOR
Albert H. Neukom,
by
Owen, Owen & Crampton Patented July 22, 1924.

1,502,480

UNITED STATES PATENT OFFICE.

ALBERT H. NEUKOM, OF TOLEDO, OHIO.

AUTOMOBILE LUGGAGE RACK.

Application filed December 20, 1920. Serial No. 431,840.

*To all whom it may concern:*

Be it known that I, ALBERT H. NEUKOM, a citizen of the United States, and a resident of Toledo, in the county of Lucas and State of Ohio, have made an Invention Appertaining to Automobile Luggage Racks; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a foldable rack that may be readily secured to the running board and to the fenders of an automobile. It provides a rack that may be readily folded into a very small compass and one that may be readily unfolded and easily secured in position.

Structures containing the invention may partake of different forms. To illustrate a practical application of the invention I have selected a structure containing the invention and shall describe it hereinafter. The structure selected is illustrated in the accompanying drawings.

Figure 1 of the drawings is a side view of the rack showing it applied to an automobile. Fig. 2 is an edge portion of a part of the rack showing the means for securing the rack to the running board. Fig. 3 illustrates a broken view of a part of the rack showing the means for attaching the ends of the rack to one or the other of the fenders.

1, Figure 1, illustrates a part of an automobile having the running board 2 and the fenders 3 and 4. The rack 5 is formed of "lazy tong" construction, it being formed of a plurality of bars 6 that are located in parallel and transverse relation, the transverse bars being connected together at their ends and at their centers in a manner well known in the art. The end bars 7 are shorter than the intermediate bars 6. The bars 7 at each end are connected together and to a clamp 8. The clamp 8 extends around the edge of the fender in each case and is provided with a threaded clamping member 9 whereby the clamp may be securely fastened to the fender. The intermediate portion of the rack is secured by one or more brackets 10 having clamps 11. The clamps 11 are also provided with threaded clamping members 12, 12. The clamps 11 fit over the edge of the running board 2 and by means of the threaded member of the clamp they may be securely fastened to the running board. Each bracket 10 has an arm 13 that extends at the same angle that the bars 6 extend and is secured to one of the bars 6 by means of the pivot pins 14 and 15 that pass through the bar. This securely holds the rack in a vertical position, and limits the lateral movement of the body portion of the rack.

I claim:

In an automobile luggage rack, a plurality of bars connected together by a double "lazy tong" construction and formed by two sets of parallel bars, the bars of one set being located at an angle to the bars of the other set and pivotally connected to the bars of the other set, screw hand clamping members having integral bar portions extending at an angle to the clamping members and forming certain of the bars of one set secured to bars of the other of the sets, and for clamping the "lazy tong" construction to the running board of an automobile and located at right angles to the running board, while the bar portions of the clamps extend at an angle to the running board, and clamps connected to the ends of the "lazy tong" construction for connecting the ends of the construction to the fenders of the automobile.

In testimony whereof I have hereunto signed my name to this specification.

ALBERT H. NEUKOM.